US007613448B2

(12) United States Patent
Yanagisawa et al.

(10) Patent No.: US 7,613,448 B2
(45) Date of Patent: Nov. 3, 2009

(54) WEB ACCESS PROVIDING SYSTEM (75) Inventors: Toshinori Yanagisawa, Yokohama (JP); Hiroyuki Yamamoto, Minato-ku (JP); Manabu Fujita, Nagareyama (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 403 days.

(21) Appl. No.: 10/727,574

(22) Filed: Dec. 5, 2003

(65) Prior Publication Data
US 2004/0110495 A1 Jun. 10, 2004

(30) Foreign Application Priority Data
Dec. 6, 2002 (JP) ............................ 2002-355440

(51) Int. Cl.
*H04M 1/725* (2006.01)
*H04K 1/00* (2006.01)
*H04W 68/00* (2009.01)
*H04L 9/32* (2006.01)
*G06F 15/16* (2006.01)

(52) U.S. Cl. .................. 455/412.1; 455/411; 455/459; 380/247; 713/169; 709/218; 726/3

(58) Field of Classification Search ................. 455/466, 455/459, 517, 411, 412.1, 412.2, 407, 408; 379/88.17, 265.09, 900; 380/247; 713/168, 713/169; 709/218; 726/3
See application file for complete search history.

(56) References Cited

U.S. PATENT DOCUMENTS 5,946,684 A  8/1999  Lund
6,141,413 A *  10/2000  Waldner et al. .......... 379/88.17
6,230,002 B1 *  5/2001  Floden et al. ............... 455/411
6,438,599 B1  8/2002  Chack
6,687,242 B1 *  2/2004  Enzmann et al. ............ 370/352

(Continued)

FOREIGN PATENT DOCUMENTS

EP          1185056          3/2002

(Continued)

OTHER PUBLICATIONS

Japanese Office Action dated Oct. 31, 2006.

*Primary Examiner*—George Eng
*Assistant Examiner*—Un C Cho
(74) *Attorney, Agent, or Firm*—Crowell & Moring LLP (57) ABSTRACT A Web access providing system that allows a user to access a Web page as if he or she is making a telephone call. When a user terminal B sends out a service request S1 and an originating connection request S12, a connection notification S4 is sent to a user terminal A through local Mobile multimedia switching system (L-MMS 1) and a gateway mobile multimedia switching system (G-MMS 2). When receiving the connection notification 4, the user terminal A performs authentication. The authentication verifies whether the telephone number of the user terminal B is contained in a telephone directory of the user terminal A. After the authentication, the user terminal A outputs a connection communication response S5 to the G-MMS 2. The connection communication response S5 contains the URL of a Web page associated with the user terminal A. The L-MMS 1 receives the URL and outputs a connection request S7. Thus, the user terminal B can access and browse the Web page implemented by a Web server 3.

5 Claims, 6 Drawing Sheets

U.S. PATENT DOCUMENTS

| | | | |
|---|---|---|---|
| 6,804,333 B1* | 10/2004 | Liu et al. | 379/88.17 |
| 6,977,909 B2* | 12/2005 | Minborg | 370/260 |
| 6,978,148 B2* | 12/2005 | Adachi et al. | 455/517 |
| 2002/0077085 A1* | 6/2002 | Kalish et al. | 455/414 |
| 2002/0112063 A1 | 8/2002 | Lohr et al. | |
| 2002/0137490 A1* | 9/2002 | Gallant | 455/411 |
| 2003/0064715 A1* | 4/2003 | Sugane | 455/414 |
| 2004/0097217 A1* | 5/2004 | McClain | 455/411 |
| 2004/0110462 A1* | 6/2004 | Forstadius | 455/3.01 |
| 2006/0079211 A1* | 4/2006 | Degraeve | 455/412.1 |

FOREIGN PATENT DOCUMENTS

| | | |
|---|---|---|
| JP | 2001-238259 | 8/2001 |
| JP | 2001-265769 | 9/2001 |
| JP | 2002-16694 | 1/2002 |
| JP | 2002-082852 | 3/2002 |
| JP | 2002-094666 | 3/2002 |
| JP | 2002-158696 | 5/2002 |
| JP | 2002-232596 | 8/2002 |
| JP | 2002-320259 | 10/2002 |

* cited by examiner

WEB ACCESS PROVIDING SYSTEM

BACKGROUND OF THE INVENTION

1. Field of the Invention

The present invention relates to a Web access providing system and in particular to a Web access providing system using portable terminals such as mobile phones.

2. Description of the Related Art

Web pages provided on the Internet are identified by URLs (Uniform Resource Locators) assigned to them. A user can enter the URL of a Web page on a client terminal to access and see the Web page. Many Web pages have links, which are indicated by buttons or tags, to other Web pages. Clicking such buttons displays the Web pages.

Not all existing Web pages can be accessed from a page through the use of links. To access Web pages that do not have links from other pages, a user resorts to using URLs contained in advertisement in magazines or business cards. In fact, there is a general trend to include a URL in magazine advertisements and business cards.

Most URLs area long character string, which often contains specific symbols unfamiliar to users and it is burdensome to type such URLs on a keyboard. With the widespread use of the Internet, the number of general users who are unskilled in key entry has increased. Accordingly, users often make keying errors and have to take the considerable trouble of rekeying. Furthermore, middle-aged and elderly people whose eyesight is falling and people having weak eyesight may have difficulty in visually identifying keys. It is burdensome for such users to enter a URL containing confusing characters such as i, j, l, and 1 or 0 (zero) and o (oh).

The following technologies are known that save users the trouble of keying of URLs: a technology in which when a user makes a telephone call to a telephone number, electronic mail containing a URL is returned and the user uses the URL to access a site (see Patent Documents 1 and 2, for example), a technology in which a user clicks on a telephone number to go to a desired Web page (see Patent Document 3, for example), and a technology in which when a user enters a simplified address such as a telephone number, the address is translated into the real address of a Web page to provide access to the Web page (see Patent Document 4, for example).

(Patent Document 1)
Japanese Patent Laid-Open No. 2002-94666 (Abstract)

(Patent Document 2)
Japanese Patent Laid-Open No. 2002-232596 (Abstract)

(Patent Document 3)
Japanese Patent Laid-Open No. 2001-265769 (paragraphs 0007 and 0016)

(Patent Document 4)
Japanese Patent Laid-Open No. 2002-82852 (paragraphs 0009 and 0010)

SUMMARY OF THE INVENTION

According to the prior-art approaches described above, a URL or some information equivalent to a URL must be entered. No simple operation is available for accessing Web pages. Therefore, there is a demand for a technology that enables users to access Web pages with a simpler operation.

The present invention has been made in order to overcome the drawback of the prior art. An object of the present invention is to provide a Web access providing system that allows a user to access Web pages with a simple operation.

According to an embodiment of the present invention, there is provided a Web access providing system comprising Web connecting means for, in response to a call from a calling subscriber terminal to a called subscriber terminal, sending a URL to connect a call to a Web page associated with the called subscriber terminal, the URL being associated with the subscriber number of the called subscriber terminal and being stored in the called subscriber terminal, whereby the system allows the calling subscriber terminal to access the Web page. This configuration allows a calling user to access a Web page with a simple operation without concern for the type of a content or the URL identifying the content, as is he or she is making a telephone call. It should be noted that, in this application, term of "terminal" includes cellular phone.

According to a further embodiment of the present invention, the Web access providing system further comprises authentication means for performing authentication of the subscriber number of the calling subscriber terminal in response to the call, wherein the Web connecting means connects the call to the Web page associated with the called subscriber terminal depending on the result of the authentication by the authentication means. This configuration allows Web page access permission to be given only to predetermined users.

According to another embodiment of the present invention, there is provided the Web access providing system, wherein the authentication by the authentication means verifies that the subscriber number of the calling subscriber terminal is contained in a subscriber number list associated with the called subscriber terminal. This configuration allows Web page access permission to be given only to users registered in the subscriber number list.

According to another embodiment of the present invention, there is provided the Web access providing system, wherein the subscriber number list is a telephone directory stored in the called subscriber terminal. This configuration allows Web page access permission to be given only to users registered in the telephone directory, through the use of well-known telephone directory functions.

According to a further embodiment of the present invention, there is provided the Web access providing system, wherein the authentication is performed in the called subscriber terminal. This configuration allows Web page access permission to be given only to predetermined users without having to add any special piece of hardware to a switch or any other devices.

According to another embodiment of the present invention, there is provided the Web access providing system, wherein the call from the calling subscriber terminal to the called subscriber terminal is access in multiple access. This configuration allows a user to access a Web page with a simple operation even while a telephone call is in progress.

DETAILED DESCRIPTION OF THE PREFERRED EMBODIMENTS

An embodiment of the present invention will be described with reference to the accompanying drawings. In the drawings referred to in the following description, like elements are labeled with like reference numerals.

Figure 1:
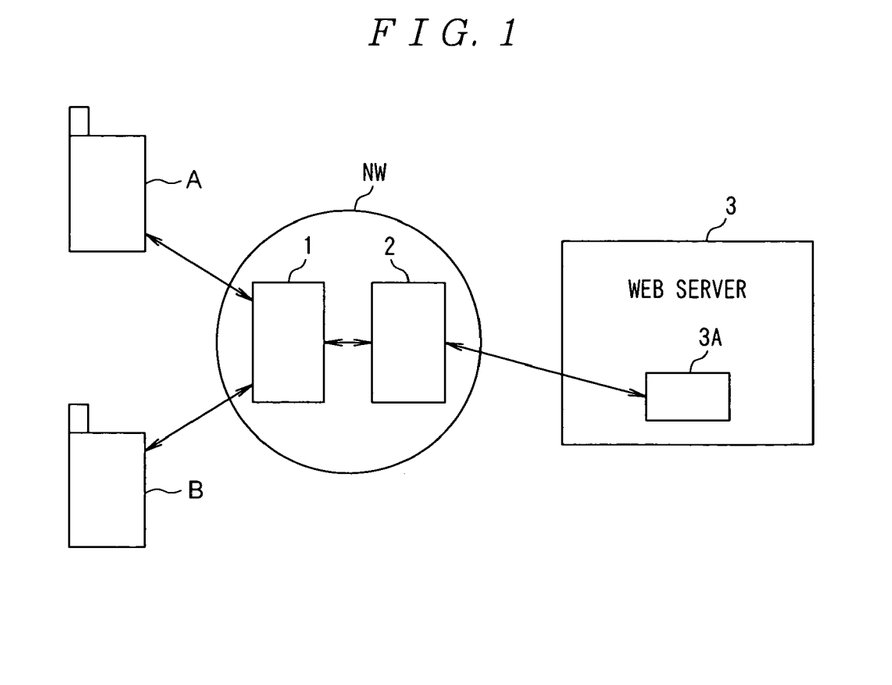
FIG. 1 is a block diagram showing a Web access providing system according to an embodiment of the present invention.

FIG. 1 is a block diagram showing a Web access providing system according to an embodiment of the present invention. In the Web access providing system according to the present embodiment, the user of user terminal A has a Web page 3A on a Web server 3, as shown in FIG. 1. That is, the user of the user terminal A has the Web page 3A associated with him or her. A "Web-page associated with a user" herein refers to a Web page the URL of which is assigned by the user. It is not limited to a Web page created by the user him/herself. It may be a Web page that is created by a third party and has a URL assigned by the user.

When user terminal B calls user terminal A in this system, authentication of the user of terminal B is performed on user terminal A. Depending on the result of the authentication, the user is allowed to access the Web page 3A through the use of function of a network NW.

In particular, if the authentication permits the user to access the Web page 3A, the user of user terminal B browse the Web page 3A. On the other hand, if the authentication does not permit the user to access the Web page 3A, the user of user terminal B cannot browse the page.

In this way, a calling subscriber unskilled in keying can comfortably access a Web page simply by operating his or her terminal as if he or she is making a telephone call.

The Web page associated with user terminal A of the calling subscriber herein may be a Web page that is provided by that user (subscriber), for example. However, it may be a Web page provided by a third party. In that case, the user previously associates the Web page provided by the third party with him/herself and specifies as his or her Web page. A user may have a number of Web pages associated with him or her. This will be described later.

The network NW is located between the Web server 3 and the users. Provided within the network NW in FIG. 1 are a Local Mobile Multimedia Switching System (hereinafter abbreviated to L-MMS) 1 and a Gateway Mobile Multimedia Switching System (hereinafter abbreviated to G-MMS) 2.

The L-MMS 1 has the function of sending a call setup request to the G-MMS 2 when it has received a service request and an originating connection request from a calling subscriber, the function of sending a connection request to the G-MMS 2 when it has received a call setup response from the G-MMS 2, and the function of sending an access request response to the calling subscriber terminal when it has received a connection response from the G-MMS 2. The G-MMS 2 has the function of sending a connection notification to a calling subscriber terminal when it has received a call setup request from the L-MMS 1, the function of sending a call setup response to the L-MMS 1 when it has received a connection communication response from the calling subscriber terminal, the function of sending a connection notification to a Web server 3 when it has received a connection request from the L-MMS 1, and the function of sending a connection response to the L-MMS 1 when it has received the connection notification response from the Web server 3.

These functions of the L-MMS 1 and G-MMS 2 allow user terminals A and B to make a telephone call and communicate with each other. In addition, the functions of the L-MMS 1 and G-MMS 2 allow a calling subscriber to access from his/her calling subscriber terminal to a Web page as if he or she is making a telephone call, as described later.

Figure 2:
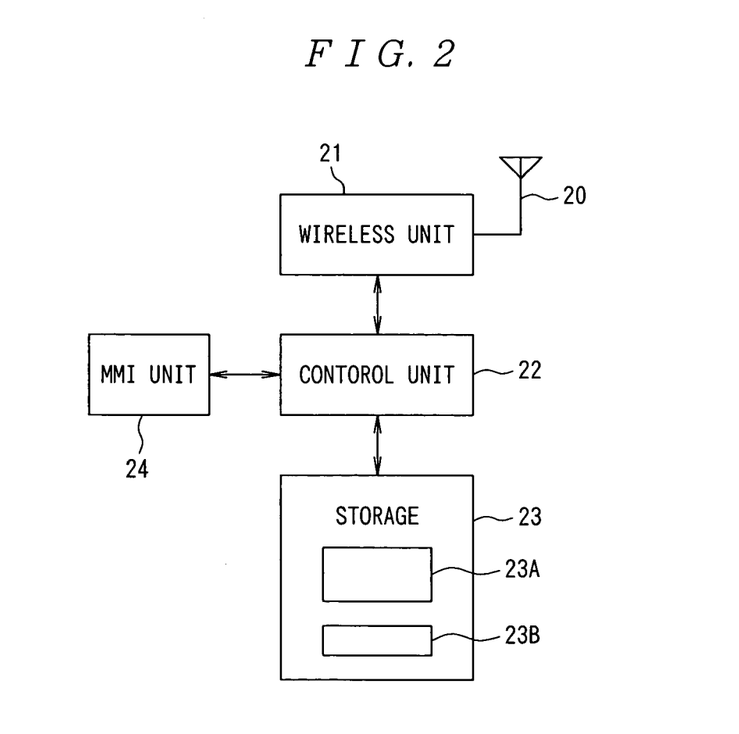
FIG. 2 is a block diagram showing an exemplary configuration of a subscriber terminal in the Web access providing system.

FIG. 2 is a block diagram showing an exemplary configuration of a terminal in the present system. In this example, a configuration of user terminal A used by a user hosting a Web page. In FIG. 2, the terminal in the system includes an antenna 20, a wireless unit 21 for sending and receiving wireless signals, a control unit 22 containing a MPU (Micro Processing Unit), controlling the components of the terminal, and performing processes such authentication, a storage 23 for storing various items of information, and a man-machine interface (hereinafter abbreviated to MMI) 24 consisting of components such as a display and dial keys. The storage 23 contains a telephone directory 23A, which is a list of subscriber numbers, and the URL 23B of a Web page associated with the user of the user terminal A, which is specified by the user.

Typically, the telephone directory 23A is telephone numbers and mail addresses pre-registered by the user. The user can selects one of them to make a telephone call or connection with a simple operation. In the present system, the telephone directory function is used to authenticate that the telephone number of a calling subscriber is registered in the telephone directory 23A (including subscriber numbers). If the telephone number is registered in the telephone directory 23A, access to a Web page associated with the URL 23B is permitted. When permitting access to the Web page, the user terminal A sends out the URL. That is, the user terminal A sends the URL in response to a call and a switch uses the URL to allow the subscriber to access the Web page specified by the user of the user terminal A.

Figure 3:
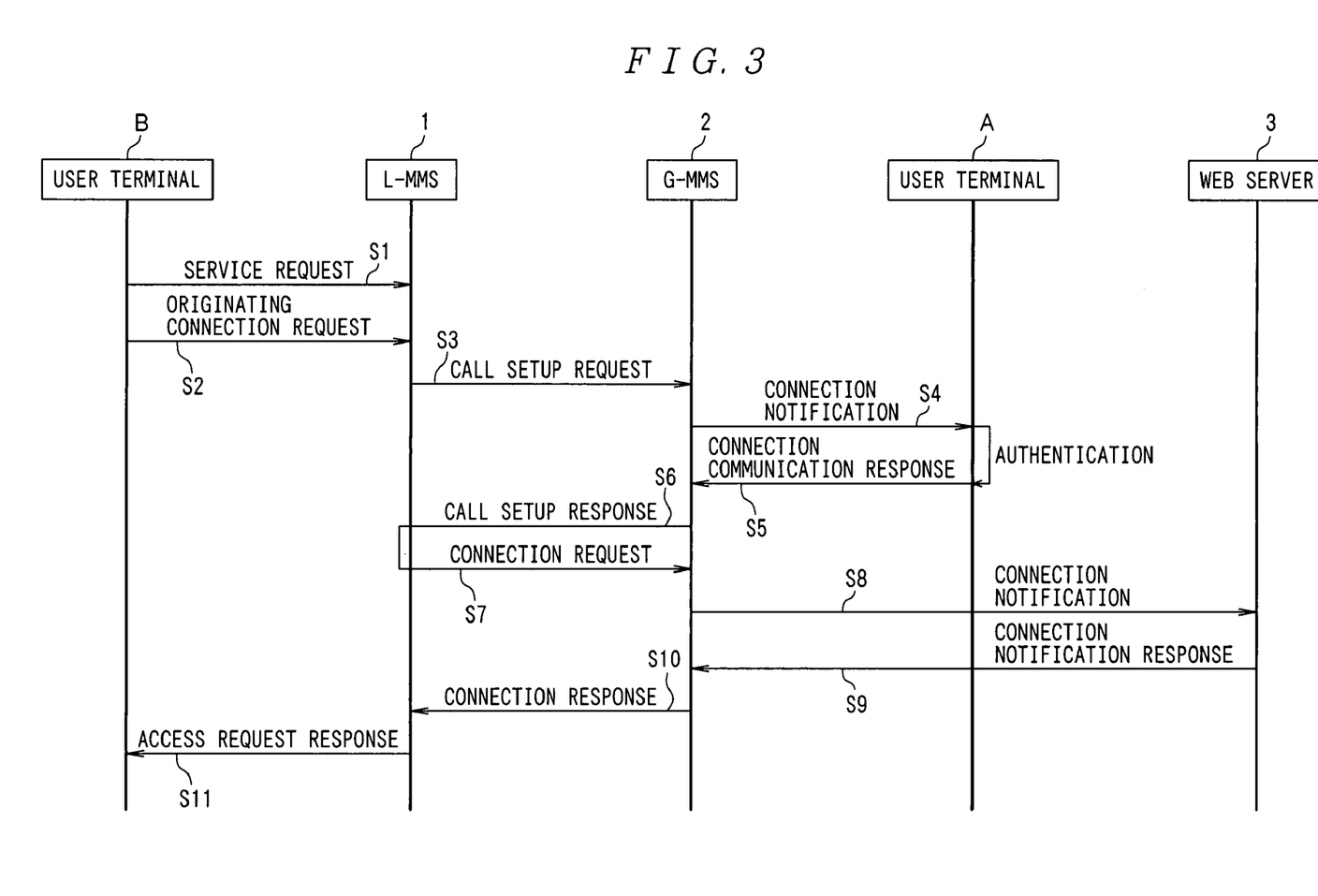
FIG. 3 is a sequence diagram showing an operation sequence performed when an access request for a Web page is issued while no telephone call is in progress.
Figure 4:
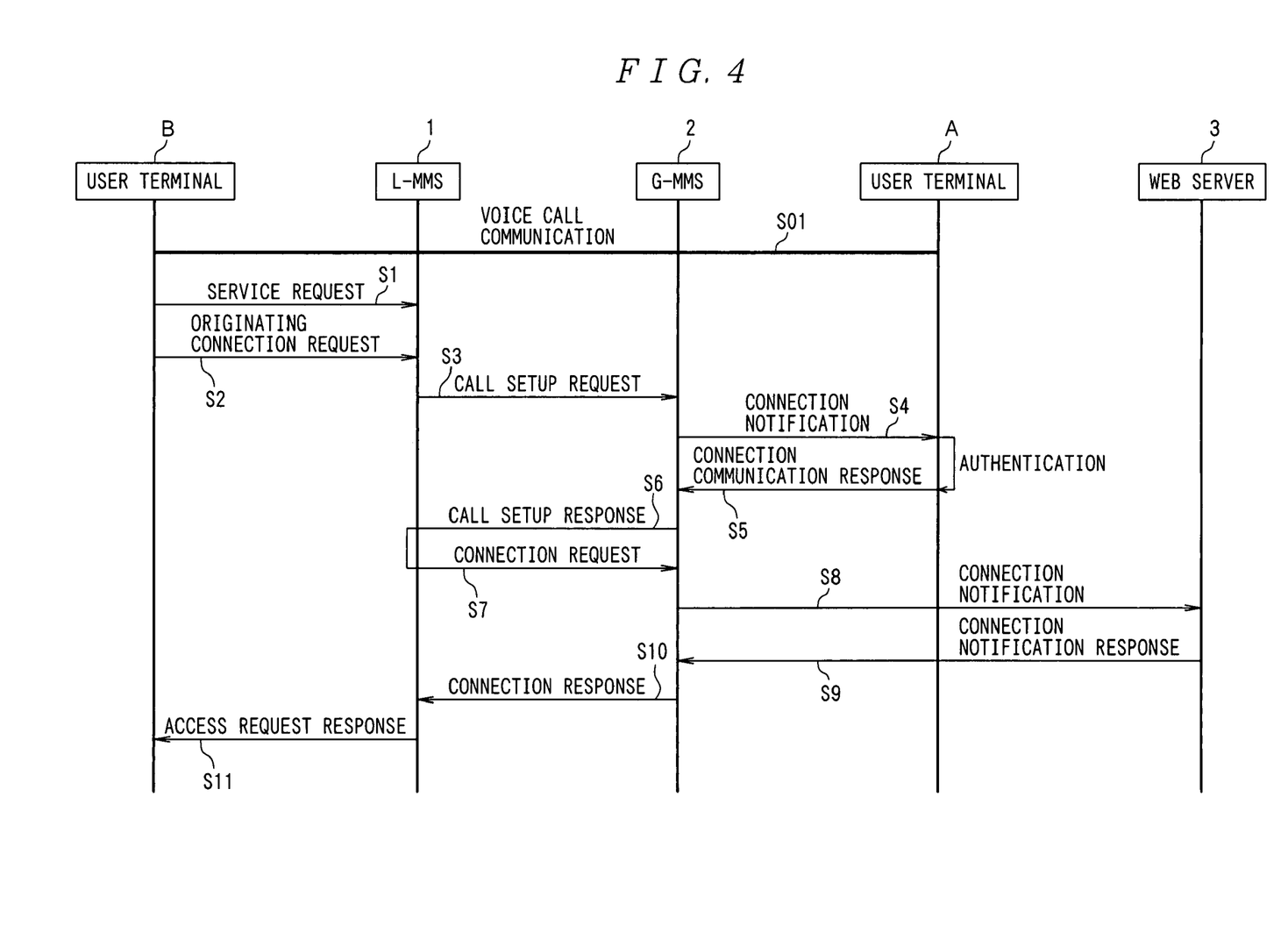
FIG. 4 is a sequence diagram showing a sequence performed when an access request for the Web page is received from the party at the other end of the telephone line while the telephone call is in progress.
Figure 5:
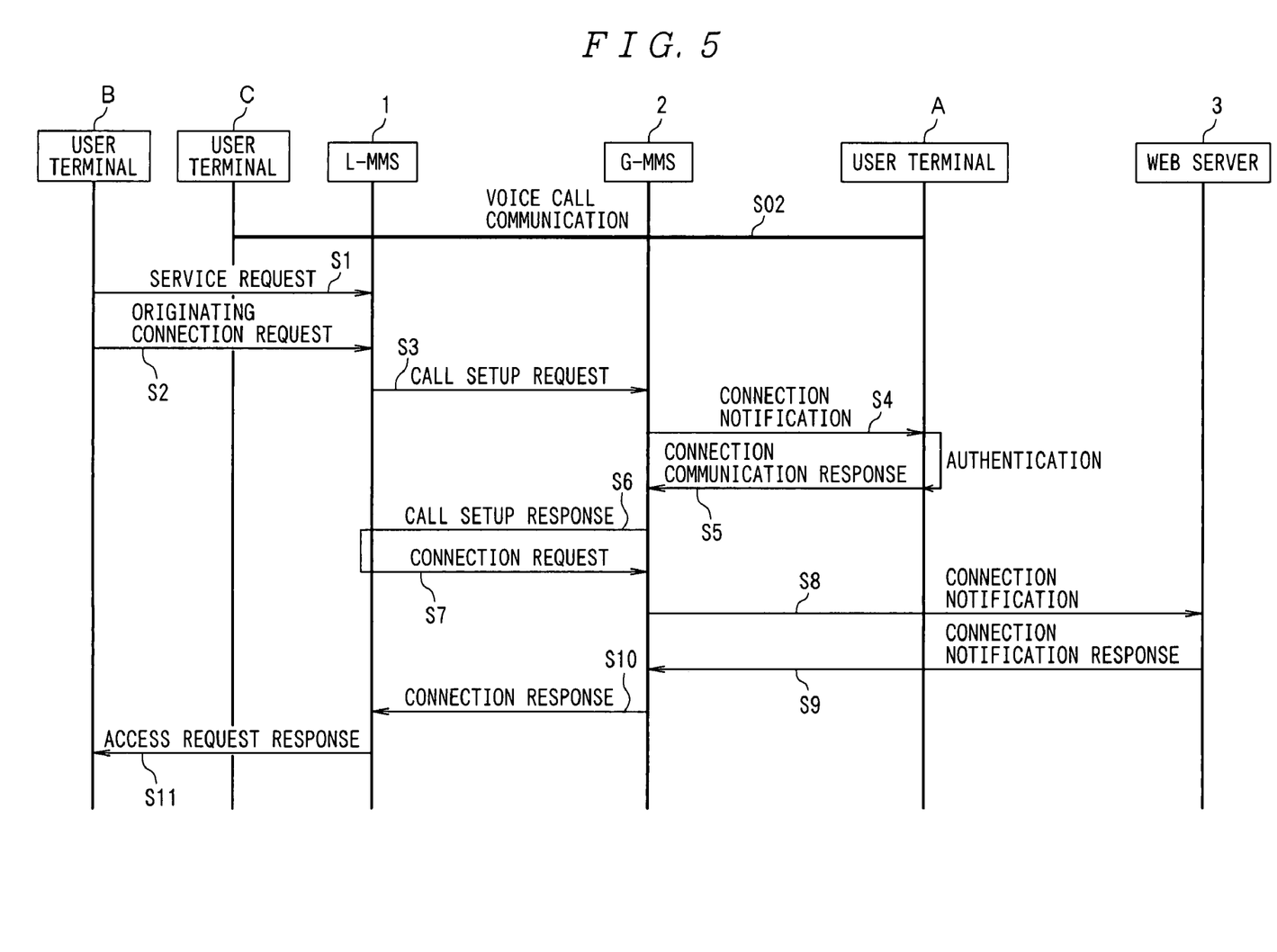
FIG. 5 is a sequence diagram showing a sequence performed when an access request for a Web page is received from a third party that is not the party at the end of the line while the voice call is in progress.

How the present system operates will be described with reference to FIG. 3 to 5. FIG. 3 shows a sequence performed when an access request for a Web page is issued while no telephone call is in progress. FIG. 4 shows a sequence performed when an access request for a Web page is received from the party at the other end of the telephone line while the telephone call is in progress. FIG. 5 shows a sequence performed when an access request for a Web page is received from a third party that is not the party at the end of the line while the telephone call is in progress.

(Access to a Web Page While no Telephone Call is in Progress)

FIG. 3 is a sequence diagram showing a sequence performed when a user access to a Web page associated with another user. In FIG. 3, user terminal B, L-MMS 1, G-MMS 2, user terminal A, and a Web page provided implemented by Web server 3 are shown.

Referring to FIG. 3, a sequence performed when the user of user terminal B access to a Web page associated with user terminal A will be described below.

First, when a service request S1 and an originating connection request S2 is sent from user terminal B by using a voice call, the requests are inputted into the L-MMS 1. The L-MMS 1 sends a call setup request S3 to the G-MMS 2. The G-MMS 2 outputs a connection notification S4 to user terminal A requesting access. When receiving the connection notification S4, user terminal A determines on the basis of an access code (which will be described later) which of Web access and a voice call the user of user terminal A is requesting. In this example, if the access code is added, it is determined that the user is requesting Web access rather than a voice call.

In addition, authentication is performed on user terminal A to verify that the telephone number of user terminal B is registered in the telephone directory in user terminal A.

If it is determined that the user is requesting Web access and the telephone number is registered in the telephone directory, user terminal A outputs a connection communication response S5 to the G-MMS 2. The connection communication response S5 includes the URL (the URL 23 B in FIG. 2) of the Web page associated with user terminal A. When receiving the connection communication response S5, the G-MMS 2 outputs a call setup response S6. The L-MMS 1 receives the call setup response S6 and outputs a connection request S7 for the URL contained in the call setup response S6. The connection request S7 may be a request message "GET" in http (hyper text transfer protocol) to which the URL is added. The connection request S7 is inputted into the G-MMS 2 and the G-MMS 2 outputs a connection notification S8. The connection notification S8 is inputted into the Web server 3 and a connection notification response S9 for the Web page implemented by the Web server 3 is sent from the Web server 3. The G-MMS 2 receives the connection notification response S9 and outputs a connection response 10 to the L-MMS 1, which outputs an access request response S11 to user terminal B. When receiving the access request response S11, the user terminal B can access and browse the Web page implemented by the Web server 3.

If user terminal A is in a dead spot (a place where the terminal cannot communicate with any base stations), authentication cannot be performed and therefore the user cannot access the Web page. When user terminal A goes out of the dead spot, user terminal B may be notified of the return of user terminal A.

Also, if user terminal A is turned off, authentication cannot be performed and therefore the user cannot access the Web page. When user terminal A is turned on and becomes ready for communication, user terminal B may be notified of the recovery of user terminal A.

User terminals A and B performing the operation describe above may or may not be terminals that support multiple access.

In the example described above, if the user wants to browse the Web page, the user can browse the Web page associated with the user without having to make conversation.

(Access to a Web Page from the Other Party of a Line)

FIG. 4 is a sequence diagram showing a sequence performed when a user who is making a voice call accesses a Web page associated with the user at the other end of the line. As in FIG. 3, shown in FIG. 4 are user terminal B, L-MMS 1, G-MMS 2, user terminal A, and a Web page implemented by Web server 3. It is assumed in the example shown in FIG. 4 that both of user terminals A and B support multiple access.

Multiple access herein refers technologies that allow multiple separate communication channels to be provided separately from each other. When an access request for a Web page is sent from the user at the other end of the line during a call as shown in FIG. 4, the user can access the Web page while holding the call. Also, if an access request for a Web page is sent from a third party other than the user at the other end of the line during the call, the access to the Web page can be provided while holding the call, as shown in FIG. 5, which will be described later. Therefore user terminal A is not limited to one communication channel from user terminal B but can send a URL over another communication channel.

Referring to FIG. 4, a sequence performed when access is made from user terminal B to a Web page associated with user terminal A while a telephone call is in progress between user terminals A and B.

In FIG. 4, one of user terminals A and B makes a call first to the other terminal A or B to start the voice call communication S01 between them. When a service request S1 and an originating connection request S12 are sent from user terminal B while the voice call communication S01 is being performed, the requests are inputted into the L-MMS 1. The remainder of the sequence is the same as the procedure described with reference to FIG. 3, the detailed description of which will be omitted here. A URL is sent from user terminal A while the voice communication network session is held. The L-MMS 1 on the network uses this URL to access the Web server to provide the access to the user terminal B. That is, the URL (the URL 23B in FIG. 2) of the Web page, which is specified beforehand in user terminal A, is sent to the L-MMS 1, which uses the URL to access the Web page. Thus, in the environment that supports multiple access, access to the Web page is allowed after authentication even if user terminal A is in conversation.

In the example described above, if an oral description in a telephone conversation is difficult for one of the users to understand, the user accesses the web page associated with the other user to see an image as an aid for understanding. For example, if it is difficult for one user to orally explain a place to meet the other user, the other user can access a web page to see a map image provided on the web page while listing to explanation for clear understanding.

(Access to a Web Page from a Third Party Other Than the Party at the Other End of a Line)

FIG. 5 shows a sequence performed when a Web page associated with one of users who are performing a voice call communication is accessed by a third party other than the other user performing the voice communication. Shown in FIG. 5 are user terminal B, user terminal C, L-MMS 1, G-MMS 2, user terminal A, and a Web page implemented by the Web server 3.

Referring to FIG. 5, a sequence performed when user terminal C accesses a Web page associated with user terminal A while user terminals A and B are in conversation with each other.

As shown in FIG. 5, when a service request S1 and an originating connection request S12 are sent from user terminal C while a voice call communication S01 is performed between user terminals A and B, the requests are inputted into the L-MMS 1. The remainder of the sequence is the same as the procedure described with reference to FIG. 3, the detailed description of which will be omitted here.

In this example, because the users are performing the voice call communication, the third party cannot make a telephone call to the users. However, the third party can access the Web page associated with user terminal A by specifying the URL of the Web page beforehand. Thus, the third party can obtain required information even if the users of terminals A and B are in conversation for a long time. Furthermore, the third party can write a message depending on the content of the Web page.

(Example of Operation of a Terminal)

Figure 6:
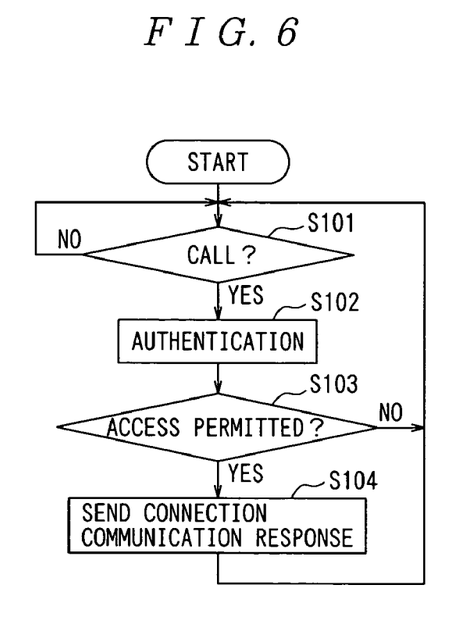
FIG. 6 is a flowchart of an exemplary process performed on a terminal.

In the sequences described above, the following process is performed in a user terminal A, which is a calling subscriber terminal. As shown in FIG. 6, when a call is received from a user of another terminal (step S101), user terminal A performs authentication of the user (step S102). If the authentication is successful and the user is permitted to access a Web page, user terminal A sends a connection communication response S5 (see FIGS. 3 to 5) (step S103 to step S104). The connection communication response contains the URL (the URL 23 B in FIG. 2) of the Web page associated with user terminal A. Then the process returns to step S101.

On the other hand, if the authentication fails and the user is not permitted to access the Web page, user terminal A does not send a connection communication response and the process returns to step S101 (step S103 to step S101).

In the case of using a user terminal B that is a calling subscriber terminal to make a voice call, the call is made in a well-known manner. In the case of accessing a Web page through user terminal A in the present system, unlike typical Web-page access using a http request, a call is made by using a subscriber number with an access code added to it. With this call, a user can access a Web page as if he or she is making a telephone call.

(Example of Operation of a Local Mobile Multimedia Switching System)

Figure 7:
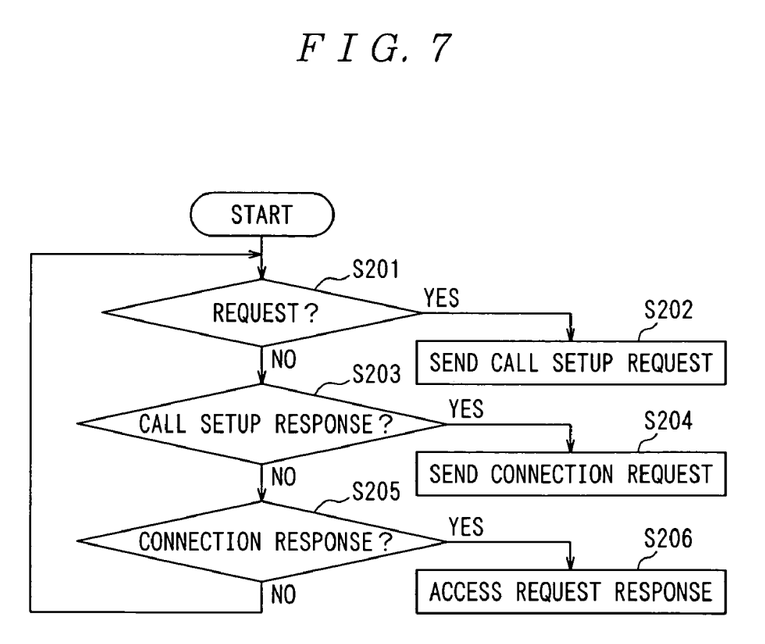
FIG. 7 is a flowchart of an exemplary process performed on a local mobile multimedia switching system.

In a local mobile multimedia switching system (L-MMS 1), the following process is performed. As shown in FIG. 7, a determination is made as to whether a service request S1 (see FIGS. 3 to 5) and an originating connection request S2 (see FIGS. 3 to 5) have been received (step S201). If the requests are received, a call set up request S3 (see FIG. 3 to 5) is sent (step S201 to step S202).

On the other hand, if a service request S1 and an originating connection request S2 is not received, a determination is made as to whether a call setup response S6 (see FIGS. 3 to 5) has been received (step S201 to step S203). If a call setup response is received, a connection request S7 (see FIGS. 3 to 5) is sent (step S203 to S204).

On the other hand, if a call setup response is not received, a determination is made as to whether a connection response has been received (step S203 to S205). If a connection response S10 (see FIGS. 3 to 5) is received, an access request response S11 (see FIGS. 3 to 5) is sent (step S205 to step S206). Otherwise, the process returns to step S201 (step S205 to step S201) and the process described above is repeated.

(Example of Operation of a Gateway Mobile Multimedia Switching System)

Figure 8:
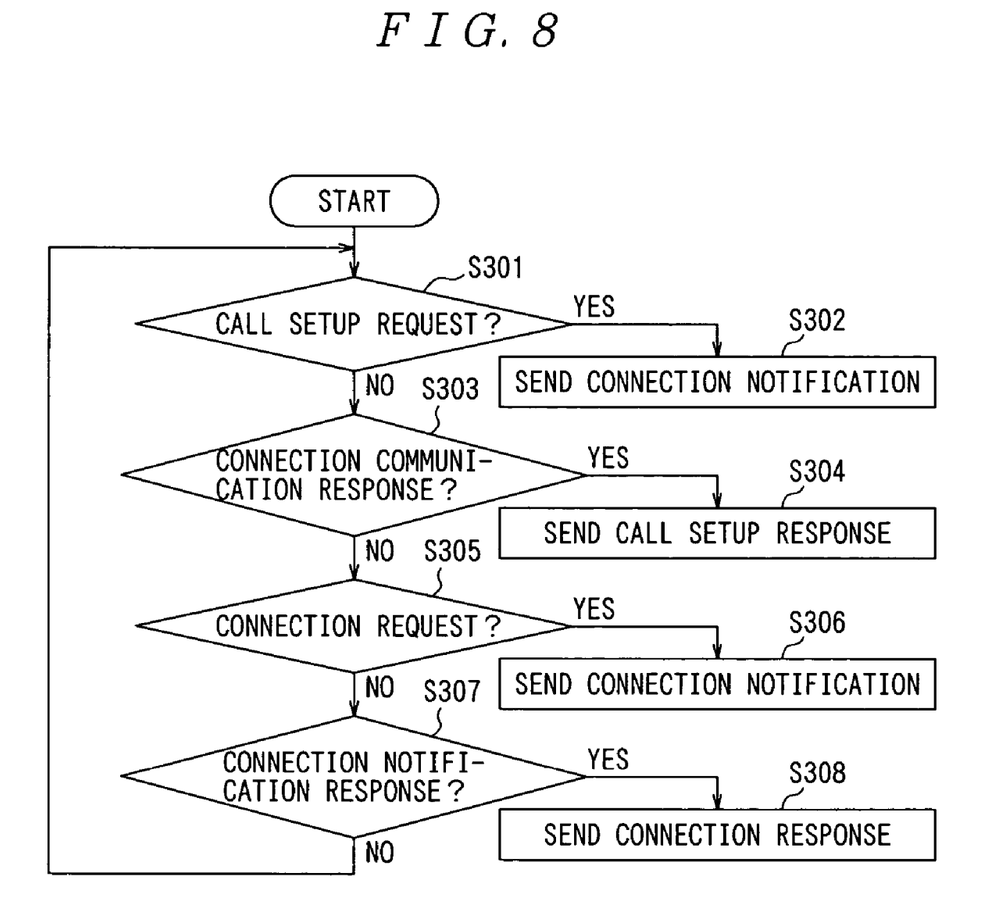
FIG. 8 is a flowchart of an exemplary process performed on a gateway mobile multimedia switching system.

The following process is performed in a gateway mobile multimedia switching system (G-MMS 2). As shown in FIG. 8, a determination is made as to whether a call setup request has been received (step S301). If a call setup request S3 (see FIGS. 3 to 5) is received, a connection notification S4 (see FIGS. 3 to 5) is sent (step S301 to step S302).

On the other hand, if a call setup request is not received, a determination is made as to whether a connection communication response has been received (step S301 to step S303). If a connection communication request S5 (see FIGS. 3 to 5) is received, a call setup response S6 (see FIGS. 3 to 5) is sent (step S303 to step S304).

On the other hand, if a connection communication response is not received, a determination is made as to whether a connection request has been received (step S303 to step S305). If a connection request S7 (see FIGS. 3 to 5) is received, a connection notification S8 (see FIGS. 3 to 5) is sent (step S305 to step S306).

On the other hand, if a connection request is not received, a determination is made as to whether a connection notification response has been received (step S305 to step S307). If a connection notification response S9 (see FIGS. 3 to 5) is received, a connection response S10 (see FIGS. 3 to 5) is sent (step S307 to step S308). Otherwise, the process returns to step S301 (step S307 to step S301) and the process described above is repeated.

(Another Exemplary Operation)

While in the processes described with reference to FIGS. 3 to 5 authentication is performed on a called subscriber terminal (user terminal A) to determine whether access to a Web page is permitted, authentication may be performed on a local mobile multimedia switching system (L-MMS 1) or a gateway mobile multimedia switching system (G-MMS 2). In that case, a table is provided in the local mobile multimedia switching system (L-MMS 1) or gateway mobile multimedia switching system (G-MMS 2) that indicates a correspondence between the subscriber number of a called subscriber terminal (user terminals A) and the URL of a Web page associated with the user of the user terminal A. The table is used to translate the subscriber number into the URL and the URL is used to access the Web page. Even if the number of users registered in a telephone directory of a called subscriber terminal is limited, authentication can be performed on a local mobile multimedia switching system (L-MMS 1) or a gateway mobile multimedia switching system (G-MMS 2). Furthermore, the load of performing authentication on the called subscriber terminal can be reduced and accordingly the life of a battery of the terminal can be saved.

While in the processes described with reference to FIGS. 3 to 5 a local mobile multimedia switching system (L-MMS 1) provides a connection to a Web server, a gateway mobile multimedia switching system (G-MMS 2) may provide a connection to a Web server.

(Access to a Web Page)

When a user terminal B which is a calling subscriber terminal makes a call to a called subscriber terminal, a determination must be made as to whether the call is requesting a voice conversation or access to a Web page. To accomplish this, access to the Web page is granted only if an access code, a certain number (for example "#9999"), is manually added to the telephone number of the called subscriber terminal. When the user makes a call without adding the access code, the call is assumed as a voice call. When the user makes a call by adding the access code, the user can access the Web page. The access code may be indicated in advance by the user of user terminal A to the user of user terminal B.

In alternative example, if a user wants to access a Web page, he or she always uses a telephone directory stored in a calling user terminal. In the telephone directory, a subscriber number with an access code added to it is registered as "telephone number 3" following "telephone number 1" and "telephone number 2" that are often used for registering the telephone numbers of a mobile phone and a fixed phone. When the user makes a call with "telephone number 3," he or she can access a Web page without having to add an access code because one has already been added to the telephone number of the call to cause the process as described above to be performed.

While the methods in which an access code is added as an indicator for determining whether a call is requesting a voice call or Web page access, Web page access may be granted only during a conversation. That is, authentication is performed only when a call is made while another telephone call is in progress. Then the Web page access may be granted. This method does not require the addition of an access code.

(Web Page and Access Control)

A Web page associated with a user may be created by operating the terminal of the user or may be created by using a personal computer. The Web page created can be browsed by another user only if the user created the page set as being accessible. If a content accessible to user terminal B (a content for which access is to be permitted) is preset, the preset range of content can be accessed by terminal B. For example, if a number of Web pages are associated with user terminal B, all or some of the Web pages may be set as being accessible. If a number of ranges to be made accessible is preset and access codes associated with them are provided, the browse of Web pages is allowed within a range depending on the an access code added to a subscriber number.

Alternatively, the browse of a portion of a Web content may be permitted. That is, only the browse of text, the browse of text and still images, or the browse of a certain image may be permitted. An access code associated with each of the accessible portions may be provided so that a Web page can be accessed to an extent depending on an access code added to a subscriber number.

Furthermore, downloading of a portion of a Web page may be permitted. That is, permission or prohibition of downloading of each of an incoming call melody, image, and text may be set. Downloading of all of a Web content may also be permitted. Access codes may be associated with each of ranges allowed to be accessed so that the content of a Web page can be accessed to an extent depending on an access code added to a subscriber number.

If a bulletin board is contained in a Web content, permission or prohibition of posting to the bulletin board may be set. An access code for permitting posting to the bulletin board may be provided so that positing to the bulletin board can be permitted depending on an access code added to a subscriber number.

(Specification of Multiple Web Pages)

A user may want associate a number of Web pages with him or her. In such a case, different access codes may be set for different Web pages. Thus, a user who wants to access a Web page can add the access code associated with that Web page when making a call.

Alternatively, access to different Web pages may be permitted with a single access code, rather than different access codes for the different Web pages. To accomplish this, a telephone directory may be used for authentication such that different, preset user groups are permitted to access different Web pages. When a mobile phone user creates a telephone directory on his or her mobile phone, he or she typically sets a number of groups such as a business associates group, a hobby group, a group of relatives, and a group of family members and registers the name, telephone number, and mail address of each of the users belonging to each of the groups. Therefore, the users belonging to one group are given access to the same Web page. This allows the different groups to access different Web pages with a single access code.

Associating different groups with different Web pages in this way can help provide separate Web pages for business and private life. In addition, an access permission for a Web page intended for the users in each of separate groups can be provided, such as intra-company group and extra-company groups, different hobby groups, and groups of friends and relatives. If a telephone directory is created in which the same user belongs to more than one group, that user can access more than one Web page, of course.

(Web Access Providing Method)

A Web access providing method as describe below is provided in the Web access providing system describe above. The Web access providing method provided comprises the Web connection step of connecting a call to a Web page associated with a called subscriber terminal in response to the call from a calling subscriber terminal to the called subscriber terminal, whereby the calling subscriber terminal is allowed to access the Web page. According to the Web access providing method, a user can access a Web page without concern for the type of a content of the Web page or the URL identifying the content, as if he or she is making a telephone call.

The method further may comprise the authentication step of performing authentication of the subscriber number of the calling subscriber terminal in response to the call, whereby the call is connected to the Web page associated with the called subscriber terminal in response at the Web connection step depending on the result of the authentication performed at the authentication step. This allows permission to access a Web page to be given to predetermined users.

The authentication performed at authentication step verifies that the subscriber number of the calling subscriber terminal is contained in a subscriber number list associated with the called subscriber terminal. This allows permission to access a Web page to be given to only users who are registered in the subscriber number list.

The subscriber number list is preferably a telephone directory stored in the called subscriber terminal. Web page access permission can be given to only users registered in the telephone directory by using a well-known telephone directory function.

Furthermore, performing the authentication at the called subscriber terminal enables Web page access permission to be given to only predetermined users without adding a special piece of hardware to a switch or any other devices.

If the call from the calling subscriber terminal to the called subscriber terminal is access in multiple access, Web page access permission can be given to a particular user even while the telephone call is in progress.

(Terminal Control Program)

In the Web access providing system described above, a terminal operates as shown in FIG. 6. Therefore, the same effects and advantages as described above can be obtained by providing a program for implementing the processes shown in FIG. 6 to control a terminal. In particular, the terminal control program comprises the incoming call detection step of detecting an incoming call sent from an external terminal and the Web connection step of outputting a response for connecting the incoming call detected at the incoming call detection step to a Web page associated with a terminal on which the terminal control program is running. This program allows a user to access a Web page without concern for the content of the Web page or the URL identifying the content as if he or she is making a telephone call.

The program further may comprise the authentication step of performing authentication of the user of the external terminal in response to the detection of the incoming call in the incoming call detection step, wherein, after the authentication at the authentication step, the response for connecting the call to the Web page associated with the terminal on which the program is running is outputted at the Web connection step. This allows Web page access permission to be given to particular users.

Preferably, a list of subscriber numbers is stored as a telephone directory in the terminal on which the program is running. Web page access permission can be given to only users registered in the telephone directory by using a well-known telephone directory function.

Furthermore, performing the authentication at the called subscriber terminal enables Web page access permission to be given to only predetermined users without adding a special piece of hardware to a switch or any other devices.

If the call from the calling subscriber terminal to the called subscriber terminal is access in multiple access, Web page access permission can be given to a particular user even while the telephone call is in progress.

The storage medium for storing the terminal control program may be a semiconductor memory, a magnetic disk, an optical disk, and any of other types of storage media. Alternatively, the program may be stored in a server and downloaded from the server to a terminal over the Internet.

As described above, according to the present invention, in response to a call from a calling subscriber terminal to a called subscriber terminal, the call is connected to a Web page associated with the called subscriber terminal to allow the calling subscriber terminal to access the Web page. Accordingly, the user of the calling subscriber terminal can access the Web page with a simple operation as if he or she is making a telephone call, without concern for the type of the content of the Web page or the URL identifying the Web page. In this way, even users who are unskilled in keying can comfortably access and browse Web pages. Furthermore, in response to a call from a calling subscriber terminal to a called subscriber terminal, authentication of the subscriber number of the calling subscriber terminal and, depending on the result of the authentication, the call is connected to a Web page associated with the called subscriber terminal to allow the authenticated calling subscriber terminal to access the Web page. This allows Web access permission to be given only to predetermined users.

According to the present invention, a user can access a Web page simply by making a call with dialing keys to make. The remaining process required for accessing the Web page is performed by a switch and other network facilities. All that is required for the user to access a Web page is to remember the telephone number he or she usually uses, add an access code to that telephone number, and make a telephone call. Accordingly, the user does not have to remember special numbers such as abbreviated codes and abbreviated dialing numbers other than telephone numbers in order to access Web pages. Instead, the user can access a Web page with a simple operation with a telephone number he or she remembers.

With the present invention, a user accesses a content not because he or she finds value in the content but because he or she finds value in that the contents is associated with (the user of) a called subscriber terminal. Accordingly the user can access the content without any concern for the subject of the content or the URL identifying the content but with the user and telephone number of the called subscriber terminal in mind. Therefore, the user of calling subscriber terminal accesses a content not because he or she is interested in the content but because he or she wants to access what the user of the called subscriber terminal is interested in (because he or she wants to improve communications with the user of the called subscriber terminal).

What is claimed is:

1. A web access providing system via a switching system comprising:
    connection request sending means for sending a request to connect a Web page associated with a called subscriber terminal by a calling subscriber terminal using at least one call provided in one communication channel based on multiple access technology;
    authentication means for performing authentication of a subscriber number of said calling subscriber terminal in response to said call;
    Uniform Resource Locator (URL) sending means for sending a Uniform Resource Locator (URL) to connect the call to the Web page associated with said called subscriber number stored in said called subscriber terminal depending on a result of said authentication by said authentication means; and
    switching means provided in the switching system for receiving said Uniform Resource Locator (URL) and outputting a connection request to connect the call to the Web page,
    wherein access to the Web page to which the URL is assigned beforehand by the user of the called subscriber terminal is granted only if an access code, which determines whether the call is requesting a voice conversation or access to a Web page, is added to the telephone number of the called subscriber terminal.

2. The web access providing system according to claim 1, wherein said authentication is performed in said called subscriber terminal.

3. A Web access providing system via a switching system comprising:
    connection request sending means for sending a request to connect a Web page associated with a called subscriber terminal by a calling subscriber terminal using at least one call provided in one communication channel based on multiple access technology;
    authentication means for performing authentication of a subscriber number of said calling subscriber terminal in response to said call;
    Uniform Resource Locator (URL) sending means for sending a Uniform Resource Locator (URL) to connect the call to the Web page associated with said called subscriber number stored in said called subscriber terminal depending on a result of said authentication by said authentication means; and
    switching means provided in the switching system for receiving said Uniform Resource Locator (URL) and outputting a connection request to connect the call to the Web page,
    wherein the authentication by said authentication means verifies that the subscriber number of said calling subscriber terminal is contained in a subscriber number list associated with said called subscriber terminal and access to the Web page to which the URL is assigned beforehand by the user of the called subscriber terminal is granted only if an access code, which determines whether the call is requesting a voice conversation or access to a Web page, is added to the telephone number of the called subscriber terminal.

4. The Web access providing system according to claim 3, wherein said subscriber number list is a telephone directory stored in said called subscriber terminal.

5. The Web access providing system according to claim 3, wherein said authentication is performed in said called subscriber terminal.

* * * * *